Oct. 12, 1948.  E. R. PUTNAM ET AL  2,450,988
ARTIFICIAL FISH BAIT
Filed Jan. 10, 1947

INVENTOR.
Earl R. Putnam
& Frank J. Nefske
BY Edward M. Apple
ATTORNEY.

UNITED STATES PATENT OFFICE 2,450,988

ARTIFICIAL FISH BAIT

Earl R. Putnam, Grosse Pointe Woods, and Frank J. Nefske, Detroit, Mich.

Application January 10, 1947, Serial No. 721,226

4 Claims. (Cl. 43—42)

This invention relates to fishing tackle, and has particular reference to an artificial fish bait which simulates a worm or night crawler mounted on a conventional type fish hook.

The invention resides in the particular combination and arrangement of parts, and the primary object of the invention is to provide an imitation fish bait, the principal parts of which may be made of rubber or other suitable plastic material which may be molded with the contours, cavities, and other formations pre-formed therein.

Another object of the invention is to generally improve devices of the character indicated, and to provide a simulated fish bait which is economical to manufacture, easy to assemble, and efficient in operation.

Another object of the invention is the provision of an artificial fish bait which simulates a fish worm on a concealed hook, and which is constructed in such manner that the point and barb of the hook are readily exposed after being struck by a fish.

Another object of the invention is the provision of an artificial fish worm which is constructed and arranged so that it may be quickly and easily mounted on a conventional fish hook.

The foregoing and other objects and advantages of the invention will become more apparent as the description proceeds, reference being made from time to time to the accompanying drawings, forming part of the within disclosure, in which drawings.

Figure 1:
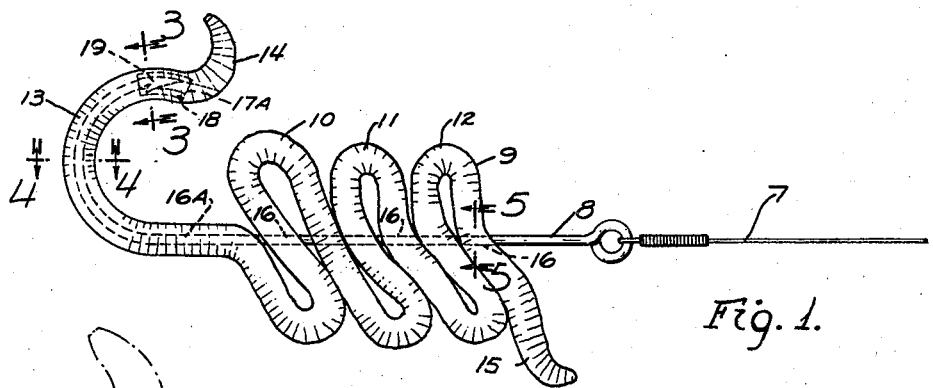
Fig. 1 is a side elevational view of a device embodying the invention and mounted at the end of a conventional fish line or leader.

Referring now more particularly to the drawings, it will be understood that in the embodiment herein disclosed, the reference character 7 indicates a fish line or leader to which is secured a conventional fish hook 8, on which is mounted the simulated fish worm 9 as hereinafter described.

The worm 9 is preferably molded of soft rubber or other plastic material which closely approaches the hardness and texture of a fish worm. The simulated worm 9 is preferably molded with the convolutions 10, 11, and 12 and the curves 13, 14, and 15 pre-formed therein. The convolutions 10, 11, and 12 need not be joined so that the simulated worm 9 may be practically drawn out straight by grasping the respective ends thereof and moving them away from each other.

Figure 2:
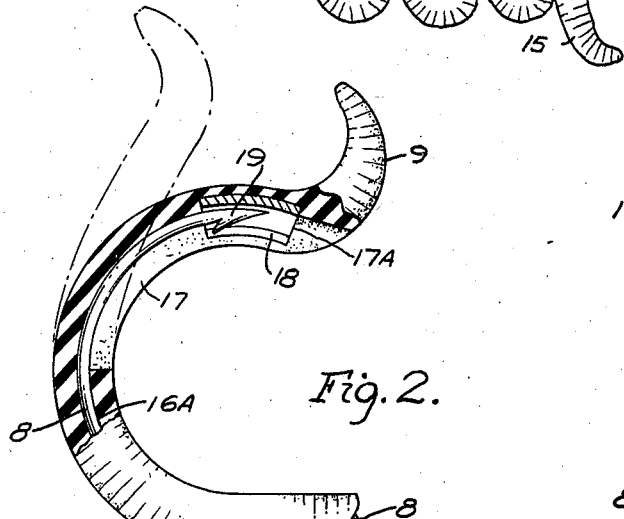
Fig. 2 is an enlarged fragmentary detail with parts in section showing the manner in which the point and barb of the fish hook is normally concealed, and illustrating the manner in which the point of the hook becomes exposed by the movement of the end of the simulated worm away from the hook.

The simulated worm 9 is also preferably molded with passageways 16 and 16A therethrough for the accommodation of the shank of the hook 8. In addition thereto, the worm 8 is preferably molded with a slot 17 (Fig. 2) which extends for a distance approximating half of the curved portion of the hook, and is arranged so that the pointed and barbed end of the hook may be readily unsheathed by movement of the end of the worm to the position shown by the dotted lines.

Figure 3:
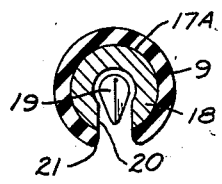
Fig. 3 is a section taken on the line 3—3 of Fig. 1.
Figure 4:
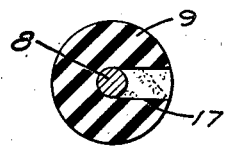
Fig. 4 is a section taken on the line 4—4 of Fig. 1.
Figure 5:
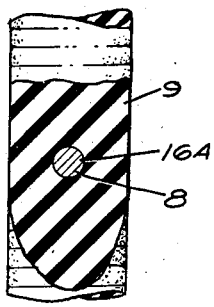
Fig. 5 is a section taken on the line 5—5 of Fig. 1.

An insert 18, preferably made of a hard rubber, metal, or other suitable material, is press fitted into an enlarged portion 17A of the slot 17, and is arranged to reinforce the worm 9 in the area of the pointed and barbed end 19 of the hook 8. The insert 18 is slotted, as at 20 (Fig. 3) and the edges 21 of the slot 17 are rounded as shown in Fig. 3 so that the hook may be readily unsheathed.

In assembling, the worm is threaded onto the hook by passing the hook through the transverse passageway 16 and the longitudinal passageway 16A and into the slot 17 until the parts assume their relative positions as shown in Fig. 1.

The device is used in the same manner as in the conventional fishing with a natural worm and hook.

Having described our invention, what we claim and desire to secure by Letters Patent is:

1. An artificial bait consisting of a flexible body bent and rebent upon itself to form a plurality of folds, each having a transverse passageway formed therethrough, there being a portion of said body having a longitudinal passageway therethrough, said last named passageway communicating with a slot adapted to accommodate a substantial part of the curved portion of a fish hook, there being an insert of hard material positioned in an enlargement of said slot and adapted to reinforce said body at one end of said slot.

2. In a device of the character described, the combination of a length of rubber molded to simulate a fish worm, a substantial portion of the body of which is bent and rebent into a plurality of folds, each having a transverse passageway therethrough, and another portion of said body having a longitudinal passageway therein communicating with said first named passageways and terminating in a longitudinal slot adapted to accommodate a portion of a fish hook, there being a substantially hard insert in an enlargement of said slot, adapted to accommodate the pointed and barbed end of a fish hook, said insert having a longitudinal slot adapted to align with said first named slot.

3. The combination with a fish hook, of a length of rubber molded to simulate a fish worm, a substantial portion of the body of which is bent and rebent to form folds, each having a passageway therethrough adapted to accommodate the shank of a fish hook, another portion of said body having a longitudinal passageway therein adapted to engage part of the curved portion of said fish hook, and another portion of said body having a longitudinal slot therein adapted to accommodate the remainder of the curved portion of said fish hook, the said longitudinal slot being enlarged at one end to accommodate an insert, and a comparatively hard insert in the enlarged portion of said slot adapted to reinforce the said body in the area of the pointed and barbed end of said fish hook.

4. The combination defined in claim 3, in which the edges of said longitudinal slot are rounded.

EARL R. PUTNAM.
FRANK J. NEFSKE.

REFERENCES CITED

The following references are of record in the file of this patent:

UNITED STATES PATENTS

| Number | Name | Date |
|---|---|---|
| 185,914 | Gregg | Jan. 2, 1877 |
| 662,139 | Warren | Nov. 20, 1900 |
| 821,732 | Olsby | May 29, 1906 |
| 2,306,181 | Neumann | Dec. 22, 1942 |